United States Patent
Yim et al.

(10) Patent No.: US 11,694,073 B2
(45) Date of Patent: Jul. 4, 2023

(54) METHOD AND APPARATUS FOR GENERATING FIXED POINT NEURAL NETWORK

(71) Applicant: SAMSUNG ELECTRONICS CO., LTD., Suwon-si (KR)

(72) Inventors: Han-young Yim, Suwon-si (KR); Do-yun Kim, Gwacheon-si (KR); Byeoung-su Kim, Hwaseong-si (KR); Nak-Woo Sung, Yongin-si (KR); Jong-han Lim, Seoul (KR); Sang-hyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1196 days.

(21) Appl. No.: 16/196,131

(22) Filed: Nov. 20, 2018

(65) Prior Publication Data

US 2019/0180177 A1    Jun. 13, 2019

(30) Foreign Application Priority Data

Dec. 8, 2017 (KR) .......................... 10-2017-0168477

(51) Int. Cl.
    *G06N 3/08* (2023.01)
    *G06F 7/483* (2006.01)
    *G06N 3/04* (2023.01)

(52) U.S. Cl.
    CPC .............. *G06N 3/08* (2013.01); *G06F 7/483* (2013.01); *G06N 3/04* (2013.01)

(58) Field of Classification Search
    CPC .................................. G06N 3/08; G06F 7/483
    USPC ............................................................ 706/25
    See application file for complete search history.

(56) References Cited

U.S. PATENT DOCUMENTS

| | | |
|---|---|---|
| 9,224,089 B2 | 12/2015 | Majumdar et al. |
| 9,400,955 B2 | 7/2016 | Garimella |
| 9,563,825 B2 | 2/2017 | Shen et al. |
| 2016/0328645 A1 | 11/2016 | Lin et al. |
| 2016/0328646 A1* | 11/2016 | Lin .................... G06V 10/454 |
| 2016/0328647 A1 | 11/2016 | Lin et al. |
| 2017/0061279 A1 | 3/2017 | Yang et al. |
| 2017/0076195 A1* | 3/2017 | Yang .................. G06N 3/0454 |
| 2017/0220929 A1 | 8/2017 | Rozen et al. |
| 2017/0286830 A1* | 10/2017 | El-Yaniv ............. G06N 3/0454 |
| 2018/0268256 A1* | 9/2018 | Di Febbo .............. G06T 7/001 |
| 2018/0349758 A1* | 12/2018 | Pan .................... G06N 3/0454 |

(Continued)

*Primary Examiner* — Suchin Parihar
(74) *Attorney, Agent, or Firm* — Sughrue Mion, PLLC

(57) ABSTRACT

A method and apparatus for generating a fixed point neural network are provided. The method includes selecting at least one layer of a neural network as an object layer, wherein the neural network includes a plurality of layers, each of the plurality of layers corresponding to a respective one of plurality of quantization parameters; forming a candidate parameter set including candidate parameter values with respect to a quantization parameter of the plurality of quantization parameters corresponding to the object layer; determining an update parameter value from among the candidate parameter values based on levels of network performance of the neural network, wherein each of the levels of network performance correspond to a respective one of the candidate parameter values; and updating the quantization parameter with respect to the object layer based on the update parameter value.

20 Claims, 14 Drawing Sheets

(56) References Cited

U.S. PATENT DOCUMENTS

| | | | |
|---|---|---|---|
| 2019/0034784 A1* | 1/2019 | Li | G06N 3/063 |
| 2019/0042945 A1* | 2/2019 | Majumdar | G06N 3/04 |
| 2019/0138882 A1* | 5/2019 | Choi | G06N 3/0481 |
| 2019/0347841 A1* | 11/2019 | Kato | G06V 20/35 |
| 2020/0097802 A1* | 3/2020 | Gudovskiy | G06N 3/04 |

* cited by examiner

METHOD AND APPARATUS FOR GENERATING FIXED POINT NEURAL NETWORK

CROSS-REFERENCE TO RELATED APPLICATION

This application claims priority from Korean Patent Application No. 10-2017-0168477, filed on Dec. 8, 2017 in the Korean Intellectual Property Office, the disclosure of which is incorporated herein by reference in its entirety.

BACKGROUND

Methods and apparatuses consistent with example embodiments relate to a neural network, and more particularly, to a method and apparatus for generating a fixed point neural network.

A neural network refers to a computational architecture modeled on a biological network in the brain of an animal. As neural network technology has developed, research has been actively conducted into a variety of electronic systems configured to use a neural network apparatus operating based on a neural network to analyze input data and extract valid information.

A neural network apparatus requires processing a large number of operations with respect to complex input data. In order for the neural network apparatus to analyze input data in real time and extract information, a technique for efficiently processing operations of a neural network is required. In particular, a system having low power consumption and high performance, such as a smartphone, has limited resources, and thus, a technique for reducing the number of operations required for processing the complex input data and maximizing the performance of the artificial neural network is needed.

SUMMARY

The present application provides a method and apparatus for maximizing target performance of a neural network by generating a fixed point neural network corresponding to a floating point neural network.

According to an aspect of an example embodiment, there is provided a method of generating a fixed point neural network of a neural network system, the method including: selecting at least one layer of a neural network as an object layer, wherein the neural network includes a plurality of layers, each of the plurality of layers corresponding to a respective one of a plurality of quantization parameters; forming a candidate parameter set including candidate parameter values with respect to a quantization parameter of the plurality of quantization parameters corresponding to the object layer; determining an update parameter value from among the candidate parameter values based on levels of network performance of the neural network, wherein each of the levels of network performance correspond to a respective one of the candidate parameter values; and updating the quantization parameter with respect to the object layer based on the update parameter value.

According to an aspect of another example embodiment, there is provided an apparatus for generating a fixed point neural network, the apparatus including: a memory; and a processor configured to execute instructions stored in the memory to generate the fixed point neural network, select one of a plurality of layers of a first fixed point neural network as an object layer, and generate a second fixed point neural network by updating a quantization parameter of the object layer based on network performance of the fixed point neural network.

According to an aspect of yet another example embodiment, there is provided method of generating a fixed point neural network of a neural network system, the method including: selecting at least one layer from among a plurality of layers of a first fixed point neural network as an object layer; generating candidate parameter values based on a parameter value which is set with respect to a quantization parameter of the object layer; determining levels of network performance, each of the levels of network performance respectively corresponding to a respective one of the candidate parameter values; and updating the quantization parameter based on a candidate parameter value of the candidate parameter values, the candidate parameter value corresponding to a highest level of network performance.

BRIEF DESCRIPTION OF THE DRAWINGS

Example embodiments will be more clearly understood from the following detailed description taken in conjunction with the accompanying drawings in which.

DETAILED DESCRIPTION OF EXAMPLE EMBODIMENTS

Hereinafter, example embodiments will be described in detail by referring to the accompanying drawings.

Figure 1:
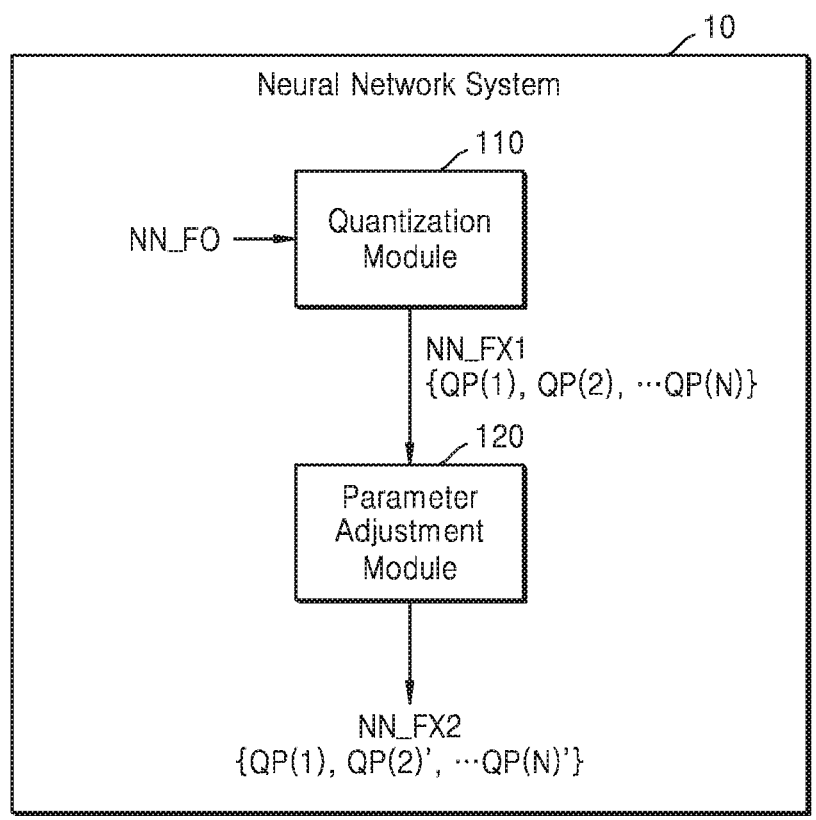
FIG. 1 is a block diagram of a neural network system according to an example embodiment.
Figure 2:
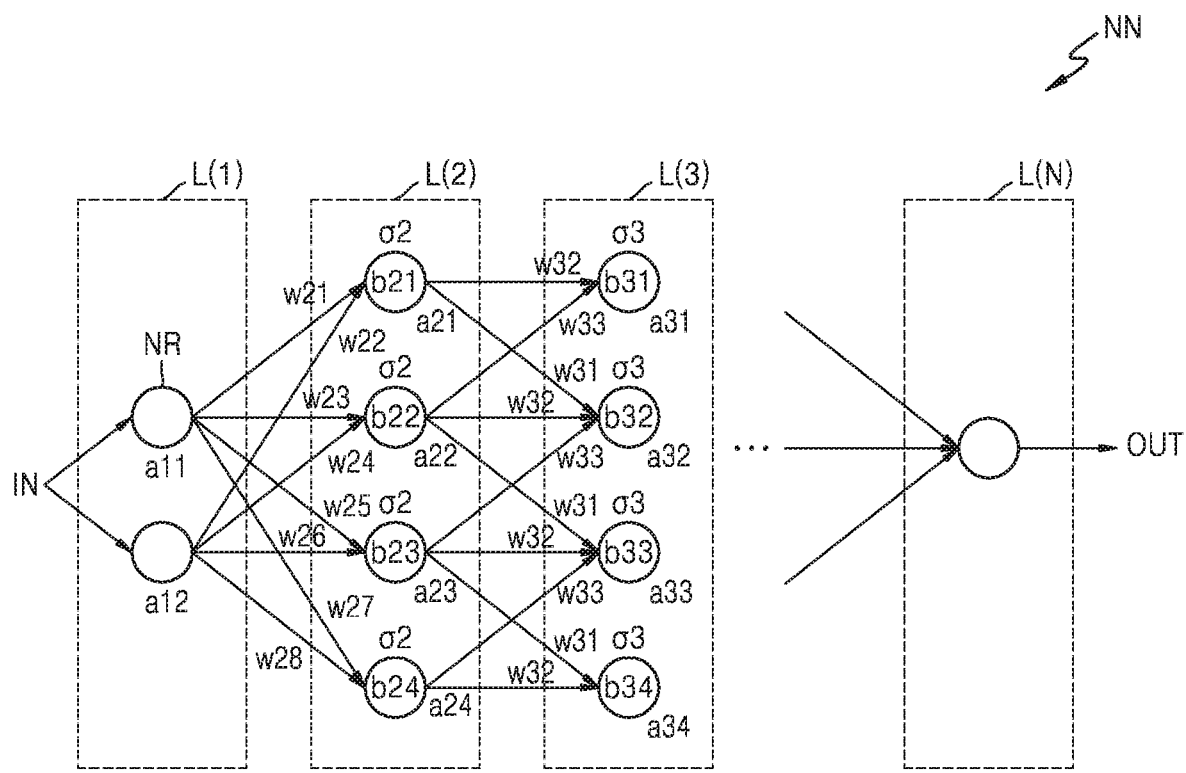
FIG. 2 shows an example of a neural network structure applied to a neural network system according to an example embodiment.

FIG. 1 is a block diagram of a neural network system 10 according to an example embodiment and FIG. 2 shows an example of a structure of a neural network NN, which is applied to the neural network system 10 according to an example embodiment.

The neural network system 10 may provide a neural network (also referred to as an artificial neural network) to another system, such as a mobile computing system, a vehicle computing system, etc., or may drive the neural network.

The neural network system 10 may be a system configured to provide (or drive) the neural network. The neural network system 10 may be referred to as a neural network apparatus. For example, the neural network system 10 may include a computing device having various processing functions, such as a function to generate a neural network, a function to train (or learn) the neural network, a function to generate a fixed point neural network based on a floating point neural network, or a function to retrain the neural network. The neural network system 10 may include at least one processor and a memory to perform the functions. The neural network system 10 may include, but is not limited to, a stationary computing system, such as a desktop computer, a server, etc., and a mobile computing system, such as a laptop computer, a smartphone, etc.

Referring to FIG. 1, the neural network system 10 may include a quantization module 110 and a parameter adjusting module 120 (also referred to as a quantization parameter adjusting module). According to an example embodiment, the quantization module 110 may be included in an additional quantization system configured to communicate with the neural network system 10.

The quantization module 110 may generate a neural network using fixed point numbers, by quantizing a neural network using floating point numbers. That is, the quantization module 110 may convert a floating point neural network NN_FO into a first fixed point neural network NN_FX1 by quantizing the floating point neural network NN_FO.

Referring to FIG. 2, the neural network NN may include a plurality of layers L(1) through L(N) sequentially processed, and the neural network NN having this multi-layered structure may be referred to as a deep neural network (DNN) or a deep learning architecture. The neural network NN may include, but is not limited to, at least one of various types of neural network models, such as a convolution neural network (CNN), such as GoogLeNet, AlexNet, VGG Network, etc., a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, a classification network, etc.

The neural network NN may perform an operation via the plurality of layers L(1) through L(N) based on input data IN and may generate output data OUT based on a result of the operation. The output data OUT may include at least one information signal. For example, the input data IN may be an image of a frame and the output data OUT may include recognition information (or a plurality of probabilities corresponding to objects) with respect to the objects included in the image.

Each of the plurality of layers L(1) through L(N) may include at least one neuron (or processing node) NR. An input operation of each of the neurons NR may be referred to as an input activation operation, and an output operation of each of the neurons NR may be referred to as an output activation operation. Activation operations (for example, all through a34) may be determined based on weights (for example, w21 through w33), biases (for example, b21 through b34), and activation functions (for example, σ2 and σ3).

The neurons NR of the adjacent layers may be connected to each other and may exchange data. One neuron NR may perform an operation by receiving data from other neurons NR and may output a result of the operation to yet other neurons NR. For example, the neurons NR of the second layer L(2) may perform an operation by receiving data from the neurons NR of the first layer L(1) and may provide a result of the operation to the neurons NR of the third layer L(3). The neurons NR of the adjacent layers may be fully or locally connected to each other. According to an example embodiment, one or more neurons NR may share weights.

Based on this multi-layered structure, the neural network NN may require computational complexity, and thus, a large number of computing resources may be needed. The neural network NN generated in the neural network system 10 via training (or learning) may be a floating point neural network NN_FO, which may require more computing resources than a fixed point neural network. The quantization module 110 may reduce the computational complexity of the neural network NN by converting the floating point neural network NN_FO into a first fixed point neural network NN_FX1, via quantization.

Quantization may refer to a process of constraining input values to a discrete set of values, which is less than the number of the input values. For example, real numbers can be mapped to integer values by rounding off the real number to the nearest integer. For example, the quantization in the neural network NN may be applied to neural network parameters, wherein the neural network parameters may include activations, weights, and biases, etc., as described above.

The floating point numbers used in the floating point neural network NN_FO may include a sign, an exponent, and a fraction or a mantissa, wherein each of the exponent, and the fraction or the mantissa may have a pre-arranged bit length (the number of bits). The fixed point numbers used in the fixed point neural network may include an integer part and a fraction part, wherein a bit length, that is, a fraction length of the fraction part may vary. In some example embodiments, the integer part of the fixed point numbers may include a sign bit. Also, a bit length representing the fixed point numbers may be less than a bit length representing the floating point numbers.

The quantization module 110 may convert the floating point neural network NN_FO into the fixed point neural network, that is, the first fixed point neural network NN_FX1, by determining quantization parameters, such as fractional lengths, signs, bit lengths, etc., with respect to the neural network parameters.

The quantization module 110 may perform quantization by taking into account the process performance of a device (for example, a mobile device, an embedded device, etc.) to which the neural network NN is deployed. The device to which the neural network NN is deployed may include, for example, an autonomous vehicle, a robotic device, a smartphone, a tablet device, an augmented reality (AR) device, an Internet of Things (IoT) device, etc., configured to perform voice recognition, image recognition, etc., by using a neural network.

Also, the quantization module 110 may perform quantization such that quantization errors may be minimized. That is, the quantization module 110 may calculate the quantization parameter, via which the quantization errors are minimized, by using various quantization methods. For example, the quantization module 110 may calculate the quantization parameter, via which the quantization errors are minimized, based on at least one moment (for example, a mean, a variance, etc.) related to distribution of neural network parameters (that is, distribution of neural network parameter values), an approximated density function (ADF) of the distribution of the neural network parameters, a statistical characteristic (for example, generalized gamma distribution) of the neural network parameters, etc. For example, the quantization module 110 may calculate a fraction length to minimize the quantization errors.

The quantization module 110 may perform quantization with respect to each of the plurality of layers L(1) through L(N), and thus, the quantization parameter with respect to each of the plurality of layers L(1) through L(N) may be determined. The first fixed point neural network (NN_FX1) output from the quantization module 110 may include the quantization parameters (for example, QP(1), QP(2), . . . , QP(N)) with respect to the plurality of layers L(1) through L(N), respectively.

In the process of quantizing the floating point neural network NN_FO via the quantization module 110, the network performance (such as accuracy) may be degraded. Thus, the first fixed point network NN_FX1 may have degraded network performance compared to the floating point neural network NN_FO.

The parameter adjusting module 120 may adjust the quantization parameter of the first fixed point neural network NN_FX1. That is, the parameter adjusting module 120 may generate a second fixed point neural network NN_FX2 in which the quantization parameter of at least one layer is changed, by adjusting (or updating) the quantization parameter of at least one layer from among the plurality of layers L(1) through L(N), based on the network performance. The second fixed point neural network NN_FX2 may include the quantization parameters (for example, QP(1), QP(2)', . . . , QP(N)') with respect to the plurality of layers L(1) through L(N), respectively, wherein one or more of the quantization parameters of the second fixed point neural network NN_FX2 may be different from the quantization parameters of the first fixed point neural network NN_FX1. Here, the network performance refers to a target performance of the neural network NN, and may include, for example, the accuracy of the neural network NN that is derived based on at least one reference. The network performance may be derived based on various metrics or evaluation references configured to evaluate target functions of the neural network NN.

The parameter adjusting module 120 may select, from among the plurality of layers L(1) through L(N) of the first fixed point neural network NN_FX1, at least one layer, with respect to which the quantization parameter is to be updated, as an object layer, and may form a candidate parameter set including candidate parameter values related to the quantization parameter of the object layer. According to an example embodiment, the candidate parameter values may be derived via an arithmetic operation based on pre-set quantization parameter values. According to an example embodiment, the candidate parameter values may be derived based on information obtained during a quantization process.

The parameter adjusting module 120 may drive the first fixed point neural network NN_FX1 by applying each of the candidate parameter values to the quantization parameter of the object layer, and may derive the network performance, that is, a level of network performance corresponding to each of the candidate parameter values, based on a result of driving the first fixed point neural network NN_FX1. The parameter adjusting module 120 may determine the candidate parameter value from among the candidate parameter values, which corresponds to the highest level of network performance, as an update parameter value, and may update the quantization parameter of the object layer based on the update parameter value. Thus, the parameter adjusting module 120 may update the quantization parameter of the object layer based on the network performance.

According to an example embodiment, the parameter adjusting module 120 may update the quantization parameter with respect to at least one of the plurality of layers L(1) through L(N) of the first fixed point neural network NN_FX1. For example, the parameter adjusting module 120 may sequentially update the quantization parameters with respect to the plurality of layers L(1) through L(N) of the first fixed point neural network NN_FX1. For example, the parameter adjusting module 120 may update the quantization parameters of the plurality of layers L(1) through L(N), that is, the first layer L(1) through the $N^{th}$ layer L(N), based on a pre-set order. For example, the parameter adjusting module 120 may update the quantization parameters with respect to the plurality of layers L(1) through L(N), in a backward direction, from the $N^{th}$ layer L(N), which is the last layer, to the first layer L(1). Alternatively, the parameter adjusting module 120 may update the quantization parameters with respect to the plurality of layers L(1) through L(N) in the backward direction, starting from the $N^{th}$ layer L(N) as described above, and then, may update the quantization parameters with respect to the plurality of layers L(1) through L(N) in a forward direction, ending with the $N^{th}$ layer L(N).

For example, the parameter adjusting module 120 may sequentially update the quantization parameters of the plurality of layers L(1) through L(N), until the network performance becomes a level that is equal to or higher than a reference level. However, example embodiments are not limited thereto. The parameter adjusting module 120 may update the quantization parameter with respect to one or more of the plurality of layers L(1) through L(N) of the first fixed point neural network NN_FX1, based on the described example orders and a combination of conditions, or other orders and conditions.

As described above, the parameter adjusting module 120 may generate the second fixed point neural network NN_FX2 by adjusting the quantization parameter of at least one layer of the first fixed point neural network NN_FX1 based on the network performance, wherein the network performance of the second fixed point neural network NN_FX2 may be higher than the network performance of the first fixed point neural network NN_FX1.

As described above, the neural network system 10 according to an example embodiment may generate the second fixed point neural network NN_FX2 having improved performance, by adjusting the quantization parameter of the first fixed point neural network NN_FX1 generated via quantization. Also, the neural network system 10 according to an example embodiment may generate the first fixed point neural network NN_FX1 by performing quantization with respect to the floating point neural network NN_FO such that the quantization error is minimized, and then, may generate the second fixed point neural network NN_FX2 by adjusting the quantization parameter of the first fixed point neural network NN_FX1 by taking into account the general network performance. Thus, the complexity of the quantization process may not be increased, while the network performance of the fixed point neural network may be improved. Hereinafter, a method of adjusting the quantization parameter according to an example embodiment, that is, a method of generating the fixed point neural network, the quantization parameter of which is updated, will be described in detail by referring to FIGS. 3 through 12.

Figure 3:
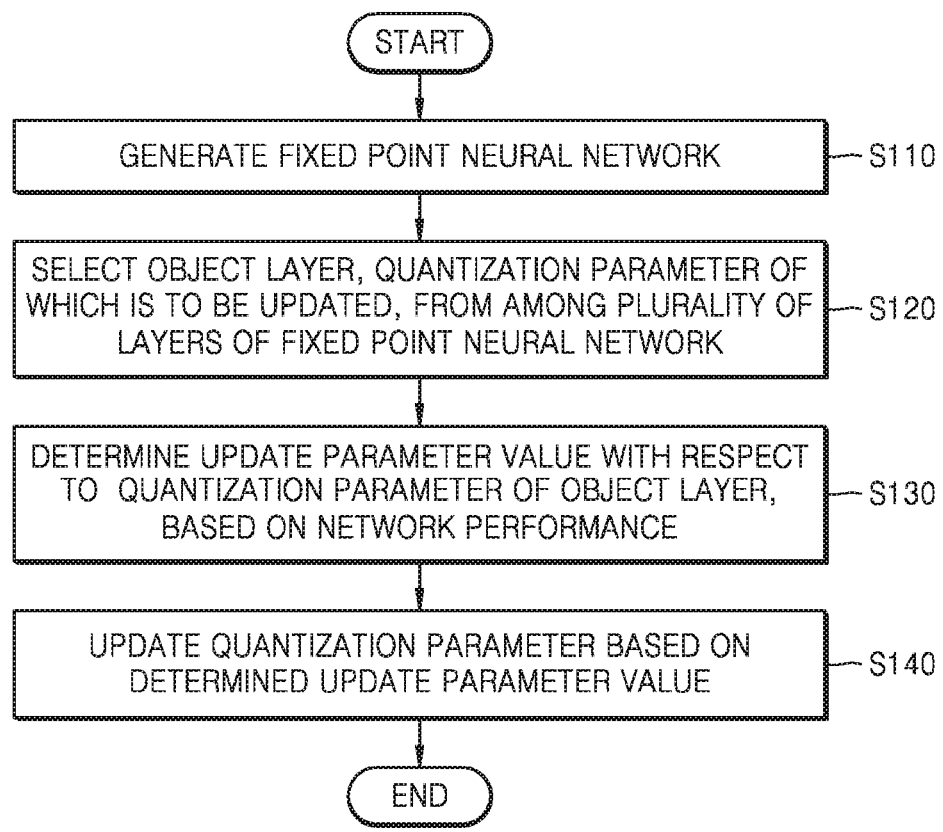
FIG. 3 is a flowchart of a method of generating a fixed point neural network, according to an example embodiment.

FIG. 3 is a flowchart of a method of generating a fixed point neural network, according to an example embodiment. In detail, the example embodiment illustrated in FIG. 3 generates the fixed point neural network having improved network performance, by adjusting a quantization parameter of the fixed point neural network, and may be performed by the parameter adjusting module 120 of FIG. 1. Accordingly, the aspects described with reference to FIG. 1 may be applied to the present example embodiment.

Referring to FIGS. 1 and 3, the parameter adjusting module 120 may generate the fixed point neural network with respect to a neural network in operation S110. That is, the parameter adjusting module 120 may generate the fixed point neural network by quantizing a floating point neural network. The fixed point neural network (for example, the first fixed point neural network NN_FX1 of FIG. 1) may include a plurality of layers, and may include quantization parameters with respect to neural network parameters of each of the plurality of layers, such as activations, biases, weights, etc. For example, the quantization parameters may include fraction lengths, bit lengths, etc. According to an example embodiment, the fixed-point neural network is generated by a quantization module (110 in FIG. 1), and the parameter adjustment module may receive a fixed-point neural network from the quantization module.

The parameter adjusting module 120 may select an object layer, a quantization parameter of which is to be updated, from among the plurality of layers of the fixed point neural network, in operation S120. According to an example embodiment, when the fixed point neural network includes N sequentially processed layers, the parameter adjusting module 120 may select the last layer of the plurality of layers, that is, an $N^{th}$ layer, as the object layer. The parameter adjusting module 120 may select the last layer, which most greatly affects the network performance of the neural network, from among the plurality of layers, as the object layer, in order to efficiently improve the network performance. However, example embodiments are not limited thereto, and the parameter adjusting module 120 may select other layers affecting the network performance of the neural network as the object layer.

According to an example embodiment, the fixed point neural network may include layers (or modules included in one layer) that are processed in parallel, and the parameter adjusting module 120 may select the plurality of layers or the plurality of modules that are processed in parallel, as the object layer.

The parameter adjusting module 120 may determine an update parameter value with respect to the quantization parameter of the object layer, based on the network performance, in operation S130. The network performance is a target performance of the neural network, that is, the fixed point neural network, and may include, for example, an accuracy of the neural network, which is derived based on at least one reference. For example, when the aim of the neural network is to perform image classification, the network performance may include a top-1 accuracy and/or a top-5 accuracy. When the aim of the neural network is to perform sound recognition, the network performance may include a word error rate. According to an example embodiment, the network performance may be derived based on an evaluation reference used in the evaluation with respect to a training process of the floating point neural network, on which the fixed point neural network is based. In addition, the network performance may be derived based on various metrics to evaluate a function aimed by the neural network, or evaluation references.

The parameter adjusting module 120 may determine the update parameter value to maximize the network performance. For example, the parameter adjusting module 120 may form a plurality of candidate parameter values, and may select, from among the plurality of candidate parameter values, the candidate parameter value via which the network performance of the neural network is to be maximized, as the update parameter value with respect to the quantization parameter of the object layer.

The parameter adjusting module 120 may update the quantization parameter of the object layer based on the determined update parameter value in operation S140. Based on the update of the quantization parameter, the network performance of the fixed point neural network may be improved. In the case of the layers except for the object layer, the quantization parameters may not be updated and previous parameter values may be maintained. Thus, a level of network performance before the update of the quantization parameter of the object layer may be compared with a level of network performance after the update of the quantization parameter of the object layer, in order to evaluate how much the update of the quantization parameter of the object layer contributes to the improvement of the network performance of the fixed point neural network.

Figure 4:
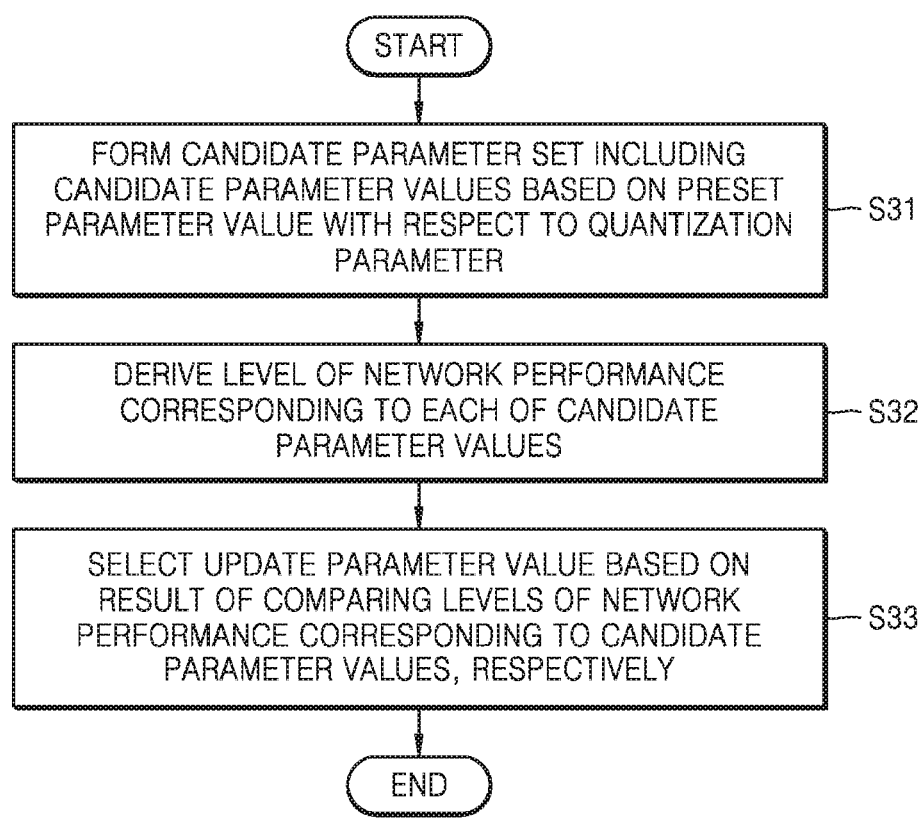
FIG. 4 is a flowchart of an operation of determining an update parameter value of FIG. 3 according to an example embodiment.
Figure 5:
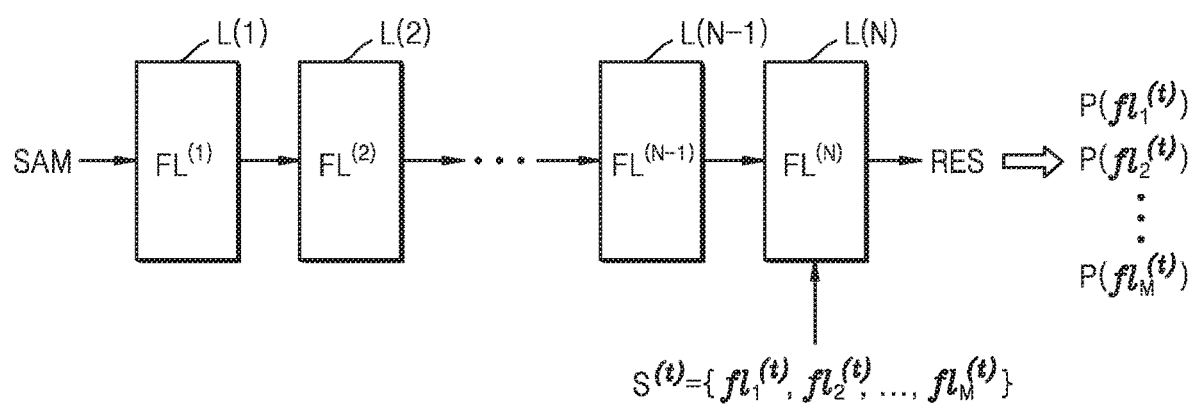
FIG. 5 is a view for describing a method of deriving a network performance level corresponding to each of candidate parameter values according to an example embodiment.

FIG. 4 is a flowchart of the operation of determining the update parameter value of FIG. 3, and FIG. 5 is a view for describing an example of a method of deriving a level of network performance corresponding to each of the candidate parameter values.

Referring to FIG. 4, the parameter adjusting module 120 may form a candidate parameter set with respect to the quantization parameter of the object layer and may select one of candidate parameter values included in the candidate parameter set as the update parameter value.

Referring to FIG. 4, the parameter adjusting module 120 may form the candidate parameter set including the candidate parameter values, based on a pre-set parameter value with respect to the quantization parameter of the object layer, that is, a current parameter value, in operation S31.

For example, when a fraction length is the quantization parameter, the parameter adjusting module 120 may form the candidate parameter set including the candidate parameter values (for example, M candidate parameter values, wherein M is an integer greater than or equal to 2), based on a current fraction length value $FL^{(t)}$ with respect to an object layer $L_T(t)$. The candidate parameter set $S^{(t)}$ may be represented by Equation 1.

$$S^{(t)} = \{fl_1^{(t)}, fl_2^{(t)}, \ldots, fl_M^{(t)}\} \quad \text{[Equation 1]}$$

Here, e, $fl_M^{(t)}$ is an $M^{th}$ candidate parameter value with respect to the object layer $L_T(t)$.

According to an example embodiment, the parameter adjusting module 120 may generate a candidate parameter values via an arithmetic operation based on the current parameter value. According to another example embodiment, the parameter adjusting module 120 may generate the candidate parameter values based on additional information derived in the quantization process. For example, the current parameter value is a parameter value from among a plurality of parameter values derived in the quantization process, via which the quantization error is minimized, and other parameter values via which the quantization error is equal to or less than a critical value, from among the plurality of parameter values, may be provided to the parameter adjusting module 120 as the additional information. The parameter adjusting module 120 may form the candidate parameter set including the parameter values via which the quantization error is equal to or less than the critical value, based on the current parameter value and the additional information.

As described above with reference to FIG. 3, in operation S120, when the parameter adjusting module 120 selects the plurality of layers or modules processed in parallel as the object layer, the parameter adjusting module 120 may form the candidate parameter set as a set of parameter values corresponding to the plurality of layers or modules. For example, when two layers are selected as a first object layer $L_T(t1)$ and a second object layer $L_T(t2)$, and each of the first object layer $L_T(t1)$ and the second object layer $L_T(t2)$ includes three candidate parameter values, the candidate parameter set may be represented by Equation 2.

$$S^{(t1,t2)}=\{(fl_1^{(t1)},fl_1^{(t2)}),(fl_1^{(t1)},fl_2^{(t2)}),(fl_1^{(t1)},fl_3^{(t2)}),\\ (fl_2^{(t1)},fl_1^{(t2)}),(fl_2^{(t1)},fl_2^{(t2)})\ldots,(fl_3^{(t1)},fl_3^{(t2)})\}$$ [Equation 2]

Thereafter, the parameter adjusting module 120 may derive the level of the network performance corresponding to each of the candidate parameter values in operation S32. The example of the method of deriving the level of network performance corresponding to each of the candidate parameter values is described with reference to FIG. 5.

Referring to FIG. 5, the fixed point neural network may include the first through $N^{th}$ layers L(1) through L(N), and a fraction length FL with respect to each of the first through $N^{th}$ layers L(1) through L(N) may be set as the quantization parameter. That is, fraction length values $FL^{(1)}$ through $FL^{(N)}$ may be set with respect to the first through $N^{th}$ layers L(1) through L(N).

When the $N^{th}$ layer L(N) is set as the object layer, a candidate parameter set $S^{(t)}$ with respect to the object layer may be formed based on a fraction length value $FL^{(t)}$ of the object layer, that is, the fraction length value $FL^{(N)}$ of the $N^{th}$ layer L(N), and levels of network performance $P(fl_1^{(t)})$, $P(fl_2^{(t)})$, ..., $P(fl_M^{(t)})$ with respect to candidate parameter values $fl_1^{(t)}$, $fl_2^{(t)}$, ..., $fl_M^{(t)}$ of the candidate parameter set $S^{(t)}$, that is, candidate fraction length values, may be derived. For example, the parameter adjusting module 120 may not change the fraction lengths with respect to the first through $N-1^{th}$ layers L(1) through L(N-1), the remaining layers except for the object layer, and may change the fraction length of the $N^{th}$ layer L(N), the object layer, to one of the candidate parameter values $fl_1^{(t)}$, $fl_2^{(t)}$, ..., $fl_M^{(t)}$, from the current fraction length value $FL^{(N)}$. In this way, the level of network performance may be derived by driving the fixed point neural network based on the fraction length which is set with respect to each of the first through $N^{th}$ layers L(1) through L(N). The parameter adjusting module 120 may sequentially evaluate the network performance with respect to the candidate parameter values $fl_1^{(t)}$, $fl_2^{(t)}$, ..., $fl_M^{(t)}$, in order to derive the levels of network performance $P(fl_1^{(t)})$, $P(fl_2^{(t)})$, ..., $P(fl_M^{(t)})$ corresponding to the candidate parameter values $fl_1^{(t)}$, $fl_2^{(t)}$, ..., $fl_M^{(t)}$, respectively.

The level of network performance refers to a level of target performance of a neural network. As described above with reference to FIG. 3, the level of network performance may be derived based on the classification and the objectives of the neural network. For example, when the aim of the neural network is to perform sound recognition, the parameter adjusting module 120 may drive the fixed point neural network by using a plurality of sound samples (SAM) as input data, may output sound recognition results (RES), and may derive the level of network performance, as a word error rate based on the RES.

According to an example embodiment, the level of network performance may be derived by performing a weighted-sum operation with respect to a plurality of performance levels calculated based on different references, for example, K (an integer that is greater than 1) performance levels. The level of network performance P may be represented by Equation 3.

$$P=\Sigma_K w_i * P_i$$ [Equation 3]

Here, $w_i$ and $P_i$ respectively indicate an $i^{th}$ weight and an $i^{th}$ performance level from among the K performance levels.

For example, when the aim of the neural network is to perform image classification, the fixed point neural network may be driven by using a plurality of image samples as input data, and image recognition signals (or a probability distribution of a plurality of classes) indicating prediction classes with respect to the image samples may be calculated. A top-1 accuracy and a top-5 accuracy may be derived based on the calculated image recognition signals. The top-1 accuracy indicates a case in which one class predicted by the fixed point neural network is a correct answer (or is not a correct answer), and the top-5 accuracy indicates a case in which a correct answer is included (or is not included) in 5 classes predicted by the fixed point neural network. The network performance P may be derived via a weighted-sum operation based on a weight which is set with respect to each of the top-1 accuracy and the top-5 accuracy.

As another example, when the aim of the neural network is to perform object detection, the level of network performance may be respectively calculated with respect to different objects. For example, the level of network performance with respect to detection of a first object, such as a vehicle, and the level of network performance with respect to detection of a second object, such as a pedestrian, may be calculated. Then, the network performance P may be derived by performing a weighted-sum operation based on a weight which is set with respect to the level of network performance corresponding to each of the different objects. In addition, the parameter adjusting module 120 may derive the level of network performance of the neural network by taking into account various performance levels calculated based on various references related to the objective of the neural network.

Further, referring to FIG. 4, the parameter adjusting module 120 may compare the levels of network performance corresponding to the candidate parameter values to each other and may select the update parameter value based on a result of the comparison, in operation S33. According to an example embodiment, the candidate parameter value corresponding to the highest level of network performance from among the levels of network performance may be selected as the update parameter value. For example, the levels of network performance $P(fl_1^{(t)})$, $P(fl_2^{(t)})$, ..., $P(fl_M^{(t)})$ derived with respect to the candidate parameter values $fl_1^{(t)}$, $fl_2^{(t)}$, ..., $fl_M^{(t)}$, respectively, may be compared with each other, and when the level of network performance $P(fl_2^{(t)})$ is the highest, the candidate parameter value $fl_2^{(t)}$ may be selected as the update parameter value. The update parameter value fl' may be represented by Equation 4.

$$fl'=\arg\max_{fl\in S^{(t)}} P(fl^{(t)})$$ [Equation 4]

A case in which the update parameter value fl' may be the same as the current parameter value, for example, the current fraction length $FL^{(t)}$, may occur. In this case, the parameter adjusting module 120 may identify that the parameter value of the object layer $L_T(t)$ of the fixed point neural network is a value to maximize the network performance.

Figure 6:
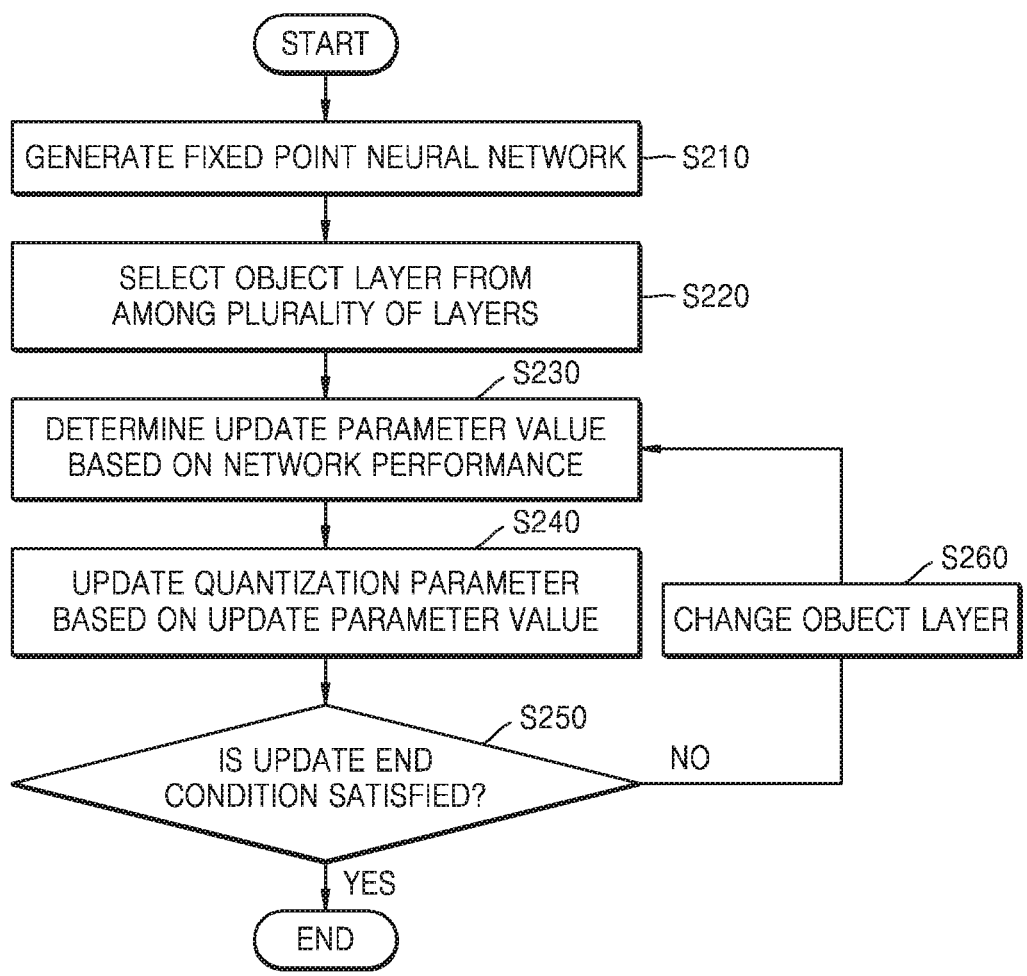
FIG. 6 is a flowchart of a method of generating a fixed point neural network, according to an example embodiment.

FIG. 6 is a flowchart of a method of generating a fixed point neural network, according to an example embodiment. The example embodiment of FIG. 6 may be performed by the parameter adjusting module 120 of FIG. 1, and the aspects described with reference to FIGS. 1 and 3 may be applied to the present example embodiment.

Referring to FIG. 6, the parameter adjusting module 120 may generate the fixed point neural network in operation S210 and may select the object layer, the quantization parameter of which is to be updated, from among the plurality of layers of the fixed point neural network, in operation S220. The parameter adjusting module 120 may determine the update parameter value with respect to the quantization parameter of the object layer based on the network performance in operation S230. The parameter adjusting module 120 may update the quantization parameter of the object layer based on the update parameter value in operation S240. Operations S210, S220, S230, and S240 correspond to operations S110, S120, S130, and S140 of FIG. 3, and thus, descriptions thereof will not be repeated.

Thereafter, in operation S250, the parameter adjusting module 120 may determine whether or not an update end condition is satisfied. When the parameter adjusting module 120 determines that the update end condition is not satisfied, the parameter adjusting module 120 may change the object layer in operation S260 and perform the update operation of the quantization parameter, based on operations S230 and S240, thereby updating the quantization parameters of the plurality of layers until the update end condition is satisfied.

According to an example embodiment, the update end condition may include the pre-set number of object layers or the pre-set number of updated layers. For example, when the pre-set number of object layers is 5, the parameter adjusting module 120 may sequentially update the quantization parameters with respect to 5 of the plurality of layers of the fixed point neural network. Also, when the pre-set number of updated layers is 3, the parameter adjusting module 120 may repeatedly update the quantization parameters with respect to the plurality of layers of the fixed point neural network, by changing the object layers, until the quantization parameters of the 3 layers are changed from previously set parameter values to other values, that is, the update parameter values.

According to example embodiments, the update end condition may include whether or not the quantization parameters with respect to all of the plurality of layers of the fixed point neural network are updated, whether or not the quantization parameters with respect to the plurality of layers are updated in a backward direction from the last layer to the first layer, and then, in a forward direction from the first layer to the last layer, or the like.

According to example embodiments, the update end condition may be set based on the network performance. For example, the update end condition may include a condition in which the network performance degradation of the fixed point neural network, as compared to the floating point neural network, becomes less than a predetermined degradation reference value, a condition in which the network performance of the fixed point neural network is increased to a value equal to or greater than a predetermined reference value, or the like.

With respect to the changing of the object layer, the changed object layer may be a previous layer or a next layer of the current object layer, with respect to which the update of the quantization parameter is performed. For example, when the update of the quantization parameter is performed with respect to the last layer, the previous layer of the last layer may be set as the object layer. Also, when the update of the quantization parameter is performed with respect to the first layer, the second layer may be set as the object layer.

In this way, the parameter adjusting module 120 may maximize network performance of the fixed point neural network by repeatedly updating the quantization parameter with respect to at least one of the plurality of layers of the fixed point neural network.

Figure 7:
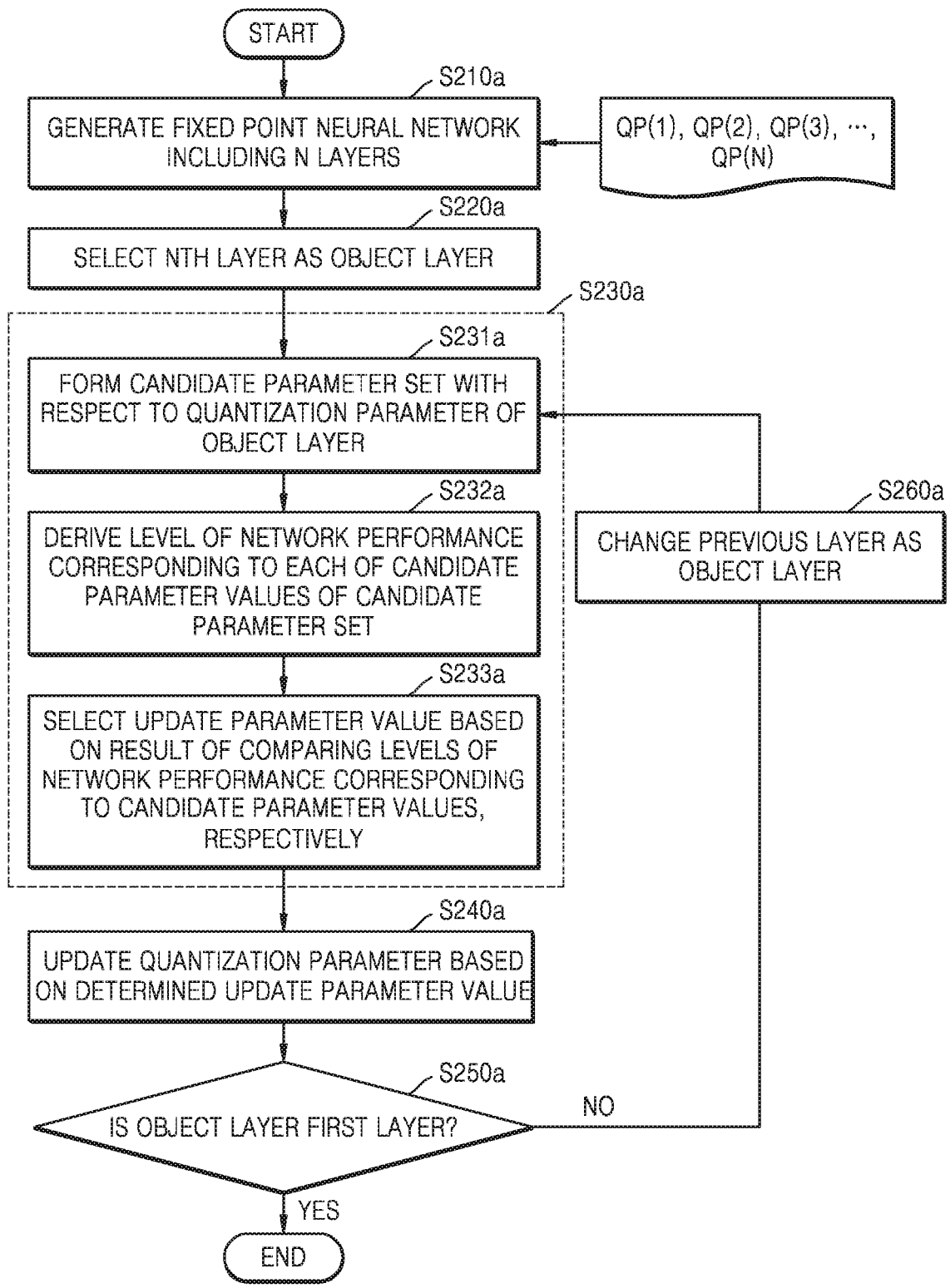
FIG. 7 is a flowchart of a method of generating the fixed point neural network of FIG. 6 according to an example embodiment.

FIG. 7 is a flowchart of an example of the method of generating the fixed point neural network of FIG. 6.

Referring to FIG. 7, the parameter adjusting module 120 may generate a fixed point neural network including N layers in operation S210a. Quantization parameters QP(1), QP(2), QP(3), ..., QP(N) with respect to the N layers may be set, respectively. FIG. 7 illustrates that one quantization parameter is set with respect to each of the N layers, for convenience of explanation. However, example embodiments are not limited thereto. A plurality of quantization parameters may be set with respect to each of the N layers.

The parameter adjusting module 120 may select the $N^{th}$ layer as an object layer in operation S220a. For example, the $N^{th}$ layer affect the network performance of the fixed point neural network more than other layers, and thus, the parameter adjusting module 120 may select the $N^{th}$ layer as the object layer.

The parameter adjusting module 120 may determine an update parameter value with respect to the quantization parameter with respect to the object layer, that is, the $N^{th}$ layer, based on the network performance, in operation S230a. In detail, the parameter adjusting module 120 may form a candidate parameter set with respect to the quantization parameter QP(N) with respect to the $N^{th}$ layer, the object layer, in operation S231a. For example, the parameter adjusting module 120 may form the candidate parameter set by generating candidate parameters based on a value currently set with respect to the quantization parameter QP(N).

The parameter adjusting module 120 may derive a level of network performance corresponding to each of candidate parameter values of the candidate parameter set in operation S232a. The parameter adjusting module 120 may apply each of the candidate parameter values as the quantization parameter of the object layer, that is, the $N^{th}$ layer, and may drive the fixed point neural network, in order to derive the level of network performance with respect to each of the candidate parameter values.

The parameter adjusting module 120 may select the update parameter value based on a result of comparing the levels of network performance corresponding to the candidate parameter values, in operation S233a. The parameter adjusting module 120 may compare the levels of network performance of the candidate parameter values to each other and may select the candidate parameter value corresponding to the highest level of network performance as the update parameter value.

The parameter adjusting module 120 may update the quantization parameter of the object layer, that is, the $N^{th}$ layer, based on the update parameter value, in operation S240a. When the update parameter value is different from the currently set parameter value, the network performance of the fixed point neural network may be improved.

The parameter adjusting module 120 may determine whether or not the object layer is the first layer in operation S250a. As described above, the current object layer is the $N^{th}$ layer. Thus, the parameter adjusting module 120 may determine that a condition to end the updating of the quantization parameter is not satisfied and may change the object layer.

The parameter adjusting module 120 may change the object layer as the previous layer, that is, the N−1$^{th}$ layer, in operation S260a. The parameter adjusting module 120 may update the quantization parameter with respect to the changed object layer by performing operations S230a and S240b.

FIGS. 8, 9, 10A, and 10B are views showing examples based on orders of updating quantization parameters according to example embodiments.

Figure 8:
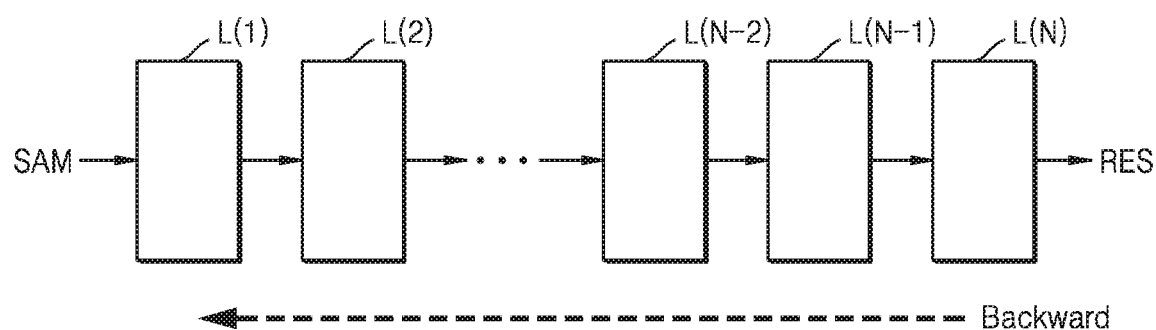
FIGS. 8, 9, 10A, and 10B are views showing examples based on orders of updating quantization parameters according to one or more example embodiments.

Referring to FIG. 8, the parameter adjusting module 120 may perform the update of the quantization parameters in a backward direction, from the last layer, that is, the N$^{th}$ layer, to the first layer L(1). Thus, the quantization parameters of at least one of the first through N$^{th}$ layers L(1) through L(N) of the fixed point neural network may be updated.

Figure 9:
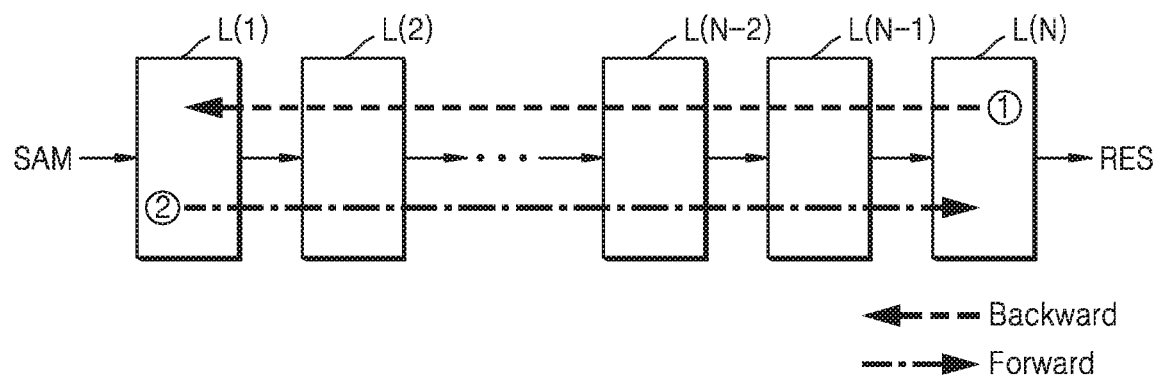

Referring to FIG. 9, the parameter adjusting module 120 may perform the update of the quantization parameters in a backward direction, from the last layer, that is, the N$^{th}$ layer, to the first layer L(1). Then, the parameter adjusting module 120 may further perform the update of the quantization parameters in a forward direction, from the first layer L(1) to the N$^{th}$ layer L(N). According to an example embodiment, the parameter adjusting module 120 may perform the update of the quantization parameters in the backward and forward directions a plurality of times until the level of network performance reaches a target level of network performance.

Figure 10A:
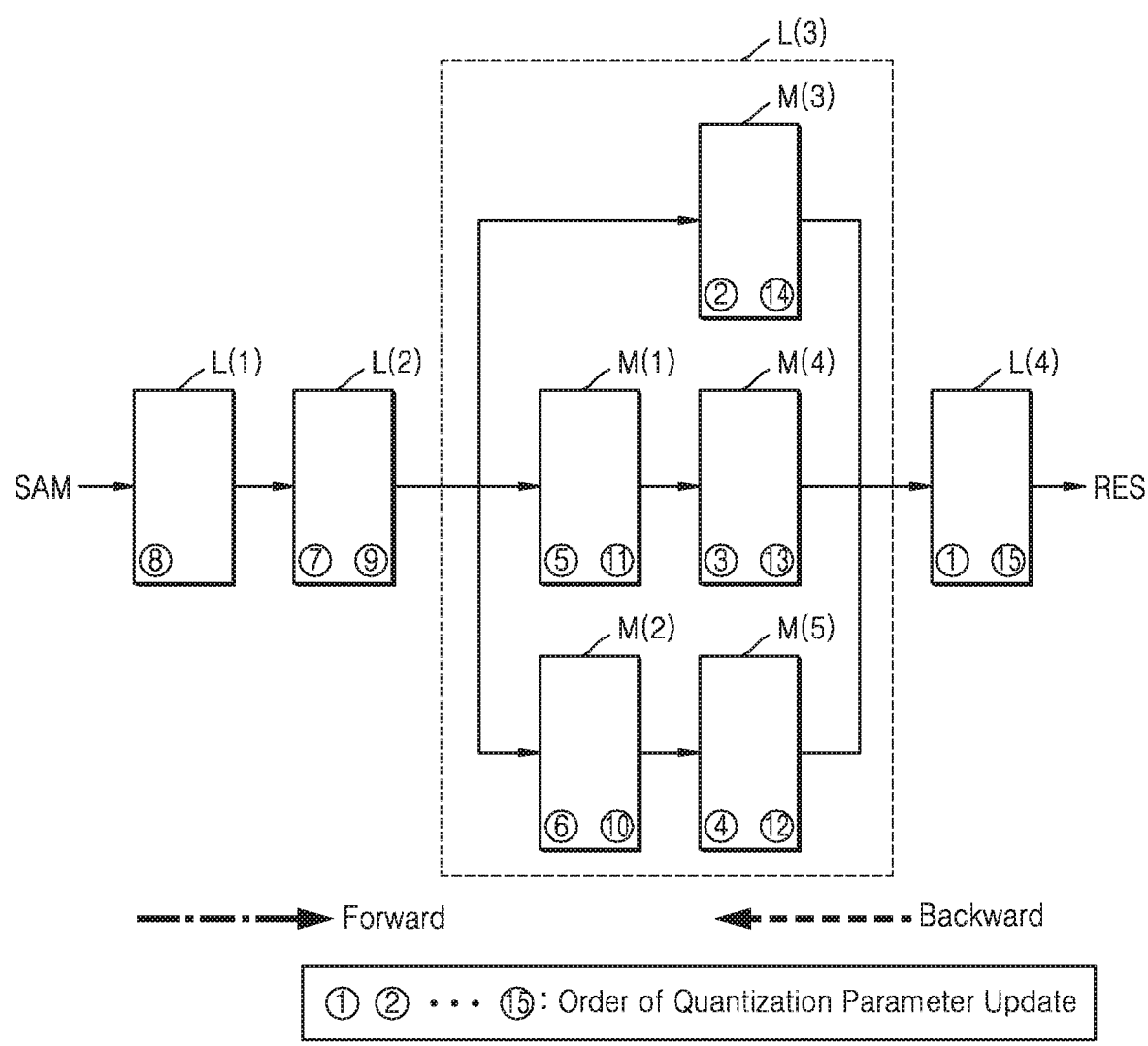
Figure 10B:
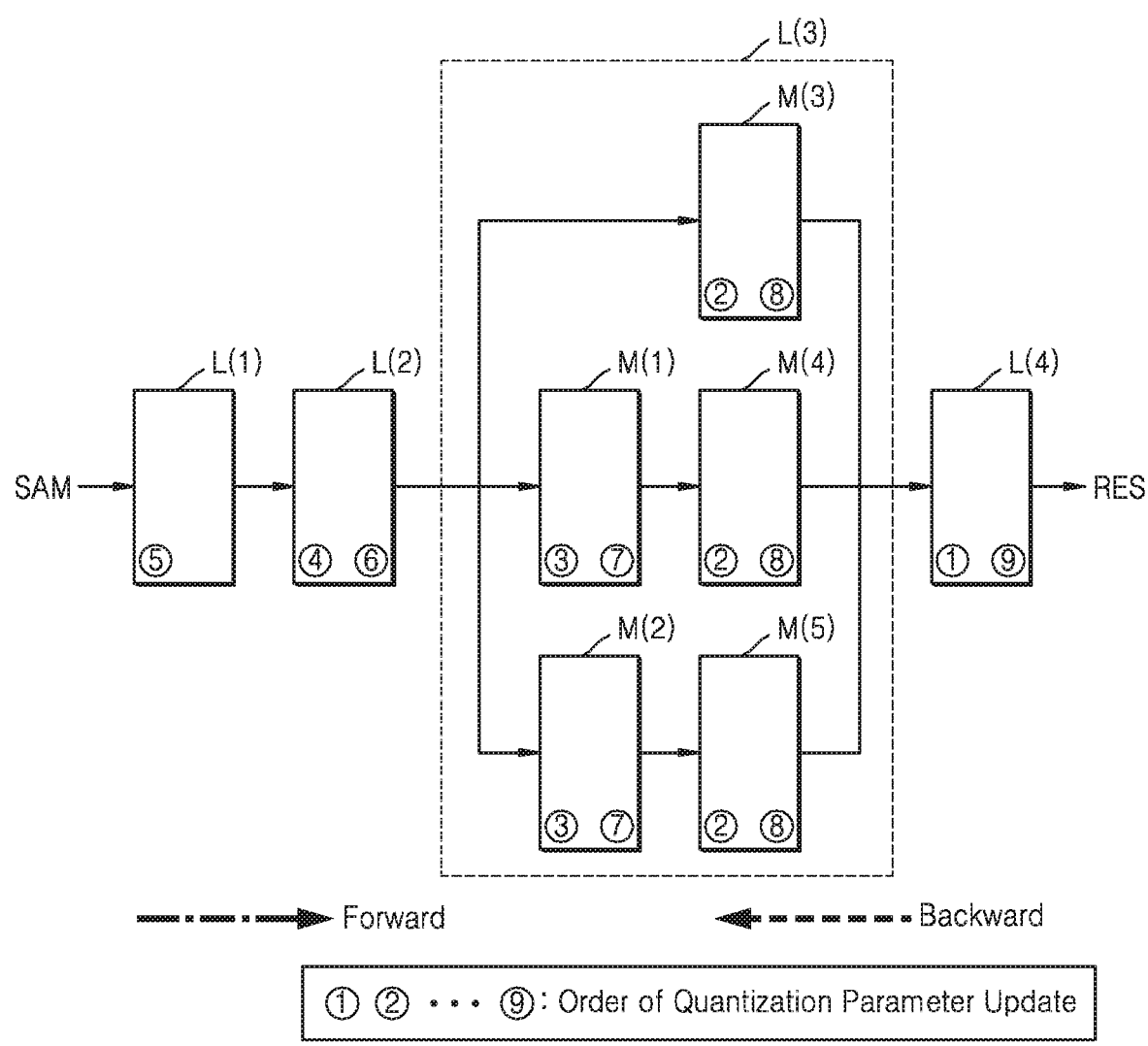

Referring to FIGS. 10A and 10B, one or more layers of the fixed point neural network, for example, the third layer L(3), may include a plurality of modules, for example, first through fifth modules M(1) through M(5). FIGS. 10A and 10B illustrate that the fixed point neural network includes first through fourth layers L(1) through L(4) and the first through fifth modules M(1) through M(5). However, the example embodiment illustrated in FIGS. 10A and 10B is shown for convenience of explanation, and the number of layers and the number of modules of the fixed point neural network may vary, according to types of neural networks (also referred to as neural network models).

Referring to FIG. 10A, the parameter adjusting module 120 may sequentially update the quantization parameters with respect to the plurality of layers and the plurality of modules in a backward direction and a forward direction in the illustrated order. Specifically, the fourth layer L(4) may be updated first, followed by the third module M(3), the fourth module M(4), the fifth module M(5), the first module M(1), the second module M(2), the second layer L(2), and the first layer L(1). Then, the second layer L(2) may again be updated, followed by the second module M(2), the first module M(1), the fifth module M(5), the fourth module M(4), the third module M(3) and the fourth layer L(4).

Also, referring to FIG. 10B, the parameter adjusting module 120 may sequentially update the quantization parameters with respect to the plurality of layers sequentially in the backward direction and the forward direction in this stated order, while simultaneously updating the quantization parameters with respect to the plurality of modules. Specifically, the fourth layer L(4) may be updated first, followed by a simultaneous update of third module M(3), fourth module M(4) and fifth module M(5), followed by a simultaneous update of first module M(1) and second module M(2), followed by an update of second layer L(2), and then first layer L(1). Then, the second layer L(2) may again be updated, followed by a simultaneous update of first module M(1) and second module M(2), followed by a simultaneous update of third module M(3), fourth module M(4) and fifth module M(5), followed by another update of fourth layer L(4).

Figure 11:
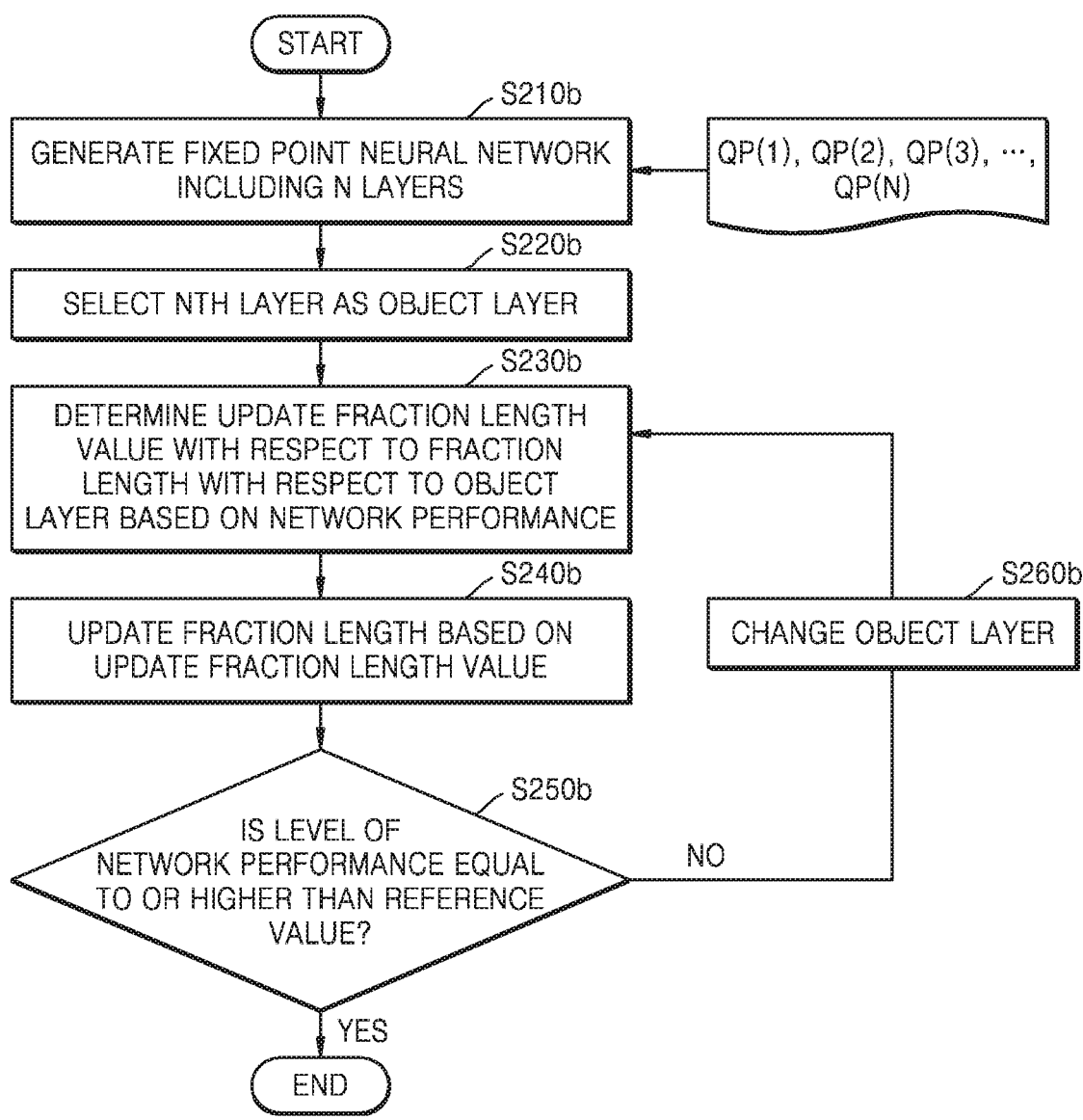
FIG. 11 is a flowchart of a method of generating the fixed point neural network of FIG. 6 according to an example embodiment.

FIG. 11 is a flowchart of an example of the method of generating the fixed point neural network of FIG. 6 according to an example embodiment. FIG. 11 shows the example in which updating is performed with respect to a fraction length.

Referring to FIG. 11, the parameter adjusting module 120 may generate the fixed point neural network including the N layers in operation S210b. The quantization parameters QP(1), QP(2), QP(3), . . . , QP(N) may be set with respect to the N layers, respectively.

The parameter adjusting module 120 may select the N$^{th}$ layer as an object layer in operation S220b.

The parameter adjusting module 120 may determine an update fraction length value with respect to the fraction length, with respect to the object layer, that is, the N$^{th}$ layer, based on the network performance, in operation S230b. As described above, the parameter adjusting module 120 may form a candidate parameter set with respect to the fraction length, based on a fraction length value currently set, and may compare levels of network performance with respect to the candidate parameters included in the candidate parameter set to each other, in order to determine the update fraction length value.

The parameter adjusting module 120 may update the fraction length of the object layer, that is, the N$^{th}$ layer, based on the update fraction length value, in operation S240b. The parameter adjusting module 120 may determine whether or not the level of network performance is equal to or higher than a reference value in operation S250b, and when the level of network performance is less than the reference value, may update the fraction lengths with respect to the other layers. The parameter adjusting module 120 may change the object layer in operation S260b. The parameter adjusting module 120 may select the other layers of the plurality of layers, except the N$^{th}$ layer, as the object layer. For example, the parameter adjusting module 120 may select the N−1$^{th}$ layer as the object layer. The parameter adjusting module 120 may change the object layer in the backward direction or the forward direction as described above. The parameter adjusting module 120 may update the fraction length with respect to the changed object layer, by performing operations S230b and S240b. The parameter adjusting module 120 may repeatedly update the fraction lengths with respect to the plurality of layers, until the level of network performance becomes equal to or greater than the reference value, and may end the updating of the fraction lengths when the level of network performance is equal to or greater than the reference value.

Figure 12:
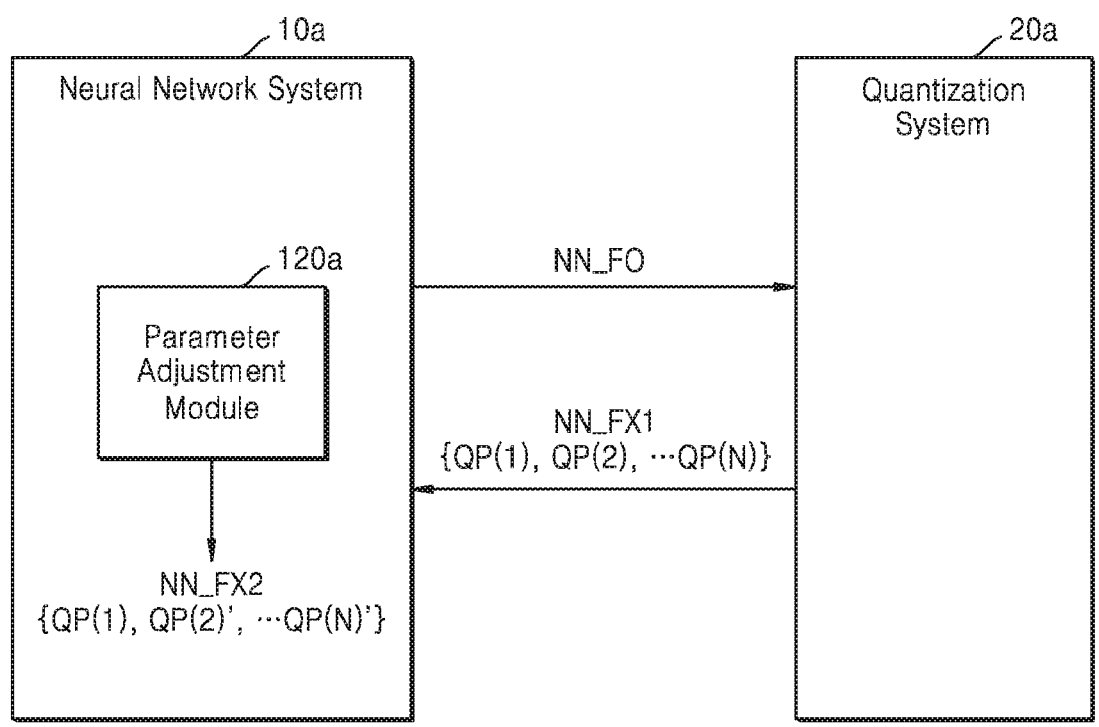
FIG. 12 is a block diagram of a neural network system and a quantization system, according to an example embodiment.

FIG. 12 is a block diagram of a neural network system 10a and a quantization system 20a, according to an example embodiment. As illustrated in FIG. 12, the neural network system 10a and the quantization system 20a may be implemented as separate computing systems.

Referring to FIG. 12, the neural network system 10a may provide the floating point neural network NN_FO to the quantization system 20a, and the quantization system 20a may quantize the floating point neural network NN_FO to generate the first fixed point neural network NN_FX1. The first fixed point neural network NN_FX1 may include the quantization parameters (for example, QP(1), QP(2), . . . , QP(N)) with respect to the plurality of layers L(1) through L(N), respectively.

The neural network system 10a may include a parameter adjusting module 120a, and the parameter adjusting module 120a may update the quantization parameter with respect to at least one of the plurality of layers of the first fixed point neural network NN_FX1, as described with reference to FIGS. 1 through 11, in order to generate the second fixed point neural network NN_FX2 having improved network performance.

According to an example embodiment, the quantization system 20a may receive the floating point neural network NN_FO from another neural network system. The neural network system 10a including the parameter adjusting module 120a may be a device in which the first fixed point neural network NN_FX1 is deployed. For example, the neural network system 10a may be the computing device configured to generate the second fixed point neural network NN_FX2 based on the first fixed point neural network NN_FX1 and to perform various tasks based on a neural network based on the second fixed point neural network NN_FX2.

Figure 13:
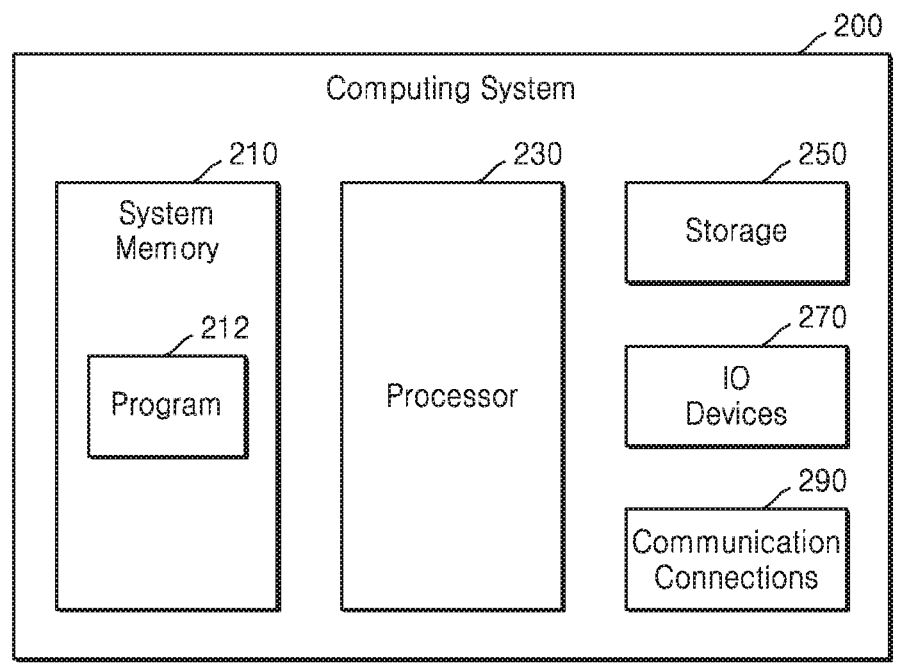
FIG. 13 is a block diagram of a computing system according to an example embodiment.

FIG. 13 is a block diagram of a computing system 200 according to an example embodiment. In some example embodiments, the neural network system 10 of FIG. 1 and the neural network system 10a of FIG. 12 may be implemented as the computing system 200 of FIG. 13. As illustrated in FIG. 13, the computing system 200 may include a system memory 210, a processor 230, a storage 250, input and output (IO) devices 270, and communication connections 290. The components included in the computing system 200 may communicate with one another, and may be connected to one another, for example, via a bus.

The system memory 210 may include a program 212. The program 212 may allow the processor 230 to update the quantization parameter of the fixed point neural network (for example, the first fixed point neural network NN_FX1) according to the example embodiments. For example, the program 212 may include an ordered listing of instructions executable by the processor 230, and the processor 230 may execute the plurality of instructions included in the program 212 to update the quantization parameter of the fixed point neural network. The system memory 210 may include, but is not limited to, a volatile memory, such as static random access memory (SRAM) and dynamic random access memory (DRAM), and a nonvolatile memory, such as flash memory, etc.

The processor 230 may include at least one core configured to execute a certain set of instructions (for example, Intel architecture-32 (IA-32), expanded 64-bit IA-32, x86-64, PowerPC, Sparc, MIPS, ARM, IA-64, etc.). The processor 230 may execute instructions stored in the system memory 210 and may update the quantization parameter of the fixed point neural network by executing the program 212.

The storage 250 may not lose stored data even if power supplied to the computing system 200 is blocked. For example, the storage 250 may include nonvolatile memories, such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), etc., or may include storage media, such as a magnetic tape, an optical disk, a magnetic disk, etc. In some example embodiments, the storage 250 may be detached from the computing system 200.

In some example embodiments, the storage 250 may store the program 212 configured to control updating the quantization parameter of the fixed point neural network according to an example embodiment, and before the program 212 is executed by the processor 230, the program 212 or at least a portion of the program 212 may be loaded to the system memory 210 from the storage 250. In some example embodiments, the storage 250 may store a file written in a programming language, and the program 212 generated based on the file by a compiler, etc., or at least a portion of the program 212 may be loaded to the system memory 210.

In some example embodiments, the storage 250 may store data to be processed by the processor 230 and/or data processed by the processor 230. For example, the storage 250 may store neural network parameters and input samples. Also, the storage 250 may store parameters of the generated fixed point neural network, that is, quantized neural network parameters and quantization parameters.

The IO devices 270 may include an input device, such as a keyboard, a pointing device, etc., and an output device, such as a display, a printer, etc. For example, a user may trigger the execution of the program 212 via the processor 230, by using the IO devices 270.

The communication connections 290 may provide access to a network outside the computing system 200. For example, the network may include a plurality of computing systems and communication links, and the communication links may include wired links, optical links, wireless links, or certain other links.

Figure 14:
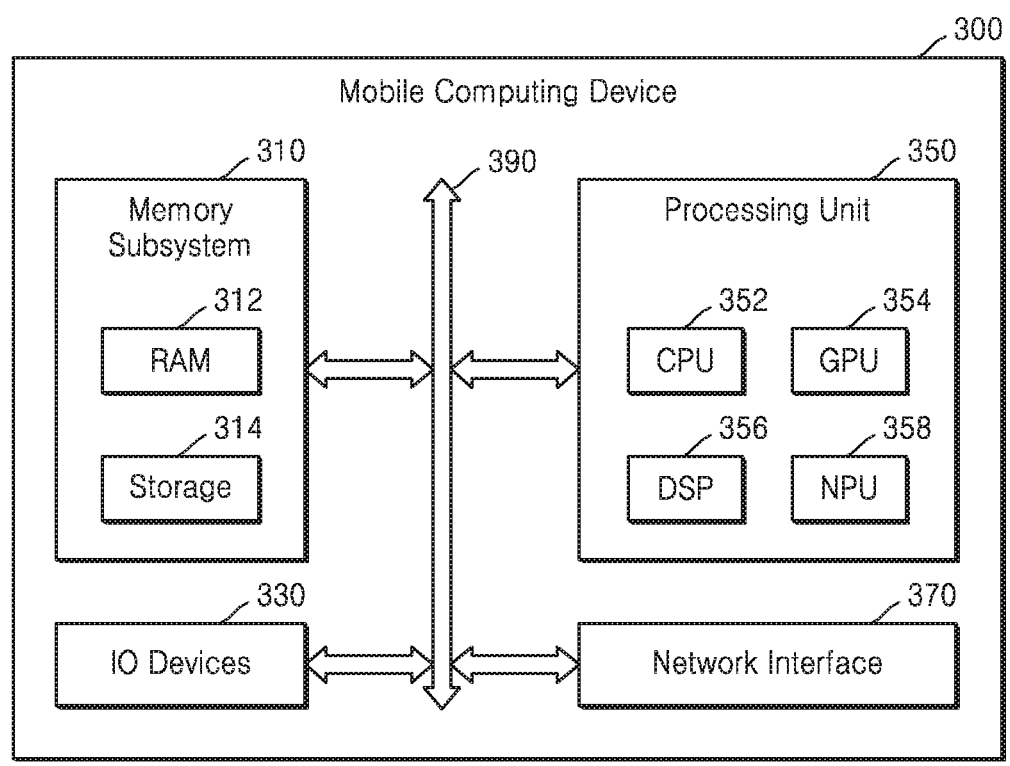
FIG. 14 is a block diagram of a portable computing device according to an example embodiment.

FIG. 14 is a block diagram of a portable computing device 300 according to an example embodiment. In some example embodiments, the fixed point neural network (for example, the second fixed point neural network NN_FX2 of FIG. 1) in which the quantization parameter is updated, according to the example embodiment, may be driven by the portable computing device 300. The portable computing device 300 may include, but is not limited to, portable electronic devices, to which power is supplied via a battery or a private power station, such as a mobile phone, a tablet personal computer (PC), a wearable device, an Internet of Things (IoT) device, etc.

According to an example embodiment, the portable computing device 300 may receive a fixed point neural network (for example, the first fixed point neural network NN_FX1 of FIG. 1) generated by a quantization module, and may update the quantization parameter of the fixed point neural network, as described with reference to the above example embodiments.

As illustrated in FIG. 14, the portable computing device 300 may include a memory sub-system 310, IO devices 330, a processing unit 350, and a network interface 370, wherein the memory sub-system 310, the IO devices 330, the processing unit 350, and the network interface 370 may communicate with one another via a bus 390. In some example embodiments, at least two of the memory sub-system 310, the IO devices 330, the processing unit 350, and the network interface 370 may be included in one package as a system-on-a-chip (SoC).

The memory sub-system 310 may include RAM 312 and a storage 314. The RAM 312 and/or the storage 314 may store an ordered listing of instructions to be executed by the processing unit 350 and data to be processed by the processing unit 350. For example, the RAM 312 and/or the storage 314 may store variables of the neural network, such as signals, weights, and biases, and may store parameters of neurons (or processing nodes) of the neural network. In some example embodiments, the storage 314 may include a nonvolatile memory.

The processing unit 350 may include a central processing unit (CPU) 352, a graphics processing unit (GPU) 354, a digital signal processor (DSP) 356, and a neural processing unit (NPU) 358. Unlike the illustration of FIG. 14, in some example embodiments, the processing unit 350 may include at least one of the CPU 352, the GPU 354, the DSP 356, and the NPU 358.

The CPU 352 may directly perform general operations of the portable computing device 300. For example, the CPU 352 may directly perform certain tasks in response to receiving an external input, for example, via the IO devices 330, or may instruct other components of the processing unit 350 to perform certain tasks. The GPU 354 may generate data for an image output via a display included in the IO devices 330, or may encode data received from a camera included in the IO devices 330. The DSP 356 may generate valid data by processing a digital signal, for example, the digital signal provided from the network interface 370.

The NPU 358 may be hardware designed for a neural network and may include a plurality of calculation nodes corresponding to one or more neurons included in the neural network, wherein one or more of the plurality of calculation nodes may process a signal in parallel.

The fixed point neural network in which the quantization parameter is updated according to the example embodiments may have improved network performance, reduced calculation complexity, and may be easily operated by the processing unit 350.

The IO devices 330 may include input devices, such as a touch input device, a sound input device, a camera, etc., and output devices, such as a display device, a sound output device, etc. For example, when a user voice is input via the sound input device, the voice may be recognized by the fixed point neural network driven by the portable computing device 300, and an operation based on the recognition of the voice may be triggered. Also, when an image is input via a camera, an object included in the image may be recognized by the fixed point neural network driven by the portable computing device 300, and an output, such as virtual reality, may be provided to a user. As described above, the fixed point neural network in which the quantization parameter is updated according to the example embodiments may have improved network performance and may provide accurate information to a user.

The network interface 370 may access mobile communication networks, such as long term evolution (LTE), 5G, etc., and may provide access to a local network, such as WiFi.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Hereinabove, example embodiments are described in the specification with reference to the drawings. Throughout the specification, certain terms are used to describe example embodiments. However, the terms should be considered in a descriptive sense only with respect to example embodiments and not for purposes of limitation. Therefore, it should be understood by one of ordinary skill in the art that various modifications and variations could be made without departing from the scope of the present disclosure. Therefore, the scope of the present disclosure is defined not by the detailed description but by the appended claims.

What is claimed is:

1. A method of updating a fixed point neural network of a neural network system, the fixed point neural network corresponding to a quantized floating point neural network, the method comprising:
   selecting at least one layer of the fixed point neural network as an object layer, wherein the fixed point neural network includes a plurality of layers, each of the plurality of layers corresponding to a respective one of a plurality of quantization parameters;
   forming a candidate parameter set including candidate parameter values with respect to a quantization parameter of the plurality of quantization parameters corresponding to the object layer;
   determining an update parameter value from among the candidate parameter values based on a comparison between levels of network performance of the fixed point neural network, wherein each of the levels of network performance corresponds to a respective one of the candidate parameter values; and
   updating the quantization parameter with respect to the object layer based on the update parameter value.

2. The method of claim 1, wherein the forming of the candidate parameter set includes generating the candidate parameter values via an arithmetic operation based on a parameter value which is set with respect to the quantization parameter of the object layer.

3. The method of claim 1, wherein the selecting includes selecting a last layer of the plurality of layers as the object layer.

4. The method of claim 1, wherein the determining the update parameter value includes:
   deriving the levels of network performance of the fixed point neural network, each of the levels of network performance corresponding to a respective one of the candidate parameter values;
   comparing the levels of network performance; and
   selecting, as the update parameter value, a candidate parameter value from among the candidate parameter values corresponding to a highest level of network performance.

5. The method of claim 4, wherein the deriving the levels of network performance of the fixed point neural network includes deriving a level of network performance with respect to one of the candidate parameter values by applying pre-set quantization parameter values to layers of the plurality of layers, except the object layer, and applying one of the candidate parameter values as the quantization parameter of the object layer,
   wherein the level of network performance with respect to one of the candidate parameter values is derived, based on each of the candidate parameter values.

6. The method of claim 5, wherein the deriving the level of network performance with respect to the one of the candidate parameter values includes:
calculating a first level of performance based on a first reference;
calculating a second level of performance based on a second reference; and
deriving the level of network performance by performing a weighted-sum operation based on a first weight which is set with respect to the first level of performance and a second weight which is set with respect to the second level of performance.

7. The method of claim 5, wherein the levels of network performance of the fixed point neural network include an accuracy of the fixed point neural network.

8. The method of claim 1, wherein the quantization parameter includes a fraction length.

9. The method of claim 1, further comprising:
determining whether or not a condition to end the updating of the quantization parameter is satisfied after the updating of the quantization parameter with respect to the object layer; and
changing the object layer, forming the candidate parameter set with respect to the object layer that was changed, determining the update parameter value, and updating the quantization parameter based on the condition to end the updating of the quantization parameter not being satisfied.

10. The method of claim 9, wherein the condition to end the updating of the quantization parameter includes at least one of whether or not a number of object layers, on which the updating of the quantization parameter is performed, or with respect to which values of the plurality of quantization parameters are changed, is equal to or greater than a pre-set value, and whether or not the levels of network performance based on the update parameter value are equal to or higher than a reference value.

11. The method of claim 9, further comprising changing the object layer by setting a previous layer of the object layer as the object layer based on the condition to end the updating of the quantization parameter not being satisfied.

12. The method of claim 1, further comprising generating the fixed point neural network by setting the quantization parameter with respect to each of the plurality of layers, based on a quantization error with respect to the floating point neural network.

13. An apparatus comprising:
a memory; and
a processor configured to execute instructions stored in the memory to generate a first fixed point neural network by quantizing a floating point neural network, select one of a plurality of layers of the first fixed point neural network as an object layer, form a candidate parameter set including candidate parameter values, and generate a second fixed point neural network by updating a quantization parameter of the object layer based on a comparison between levels of network performance of the fixed point neural network respectively corresponding to the candidate parameter values.

14. The apparatus of claim 13, wherein the processor is further configured to execute the instructions stored in the memory to:
form the candidate parameter set based on a parameter value which is pre-set with respect to the quantization parameter of the object layer;
determine the levels of network performance of the first fixed point neural network, each of the levels of network performance corresponding to a respective one of the candidate parameter values, respectively; and
update the quantization parameter of the object layer based on an update parameter value selected from the candidate parameter values based on a result of comparing the levels of network performance.

15. The apparatus of claim 14, wherein the processor is further configured to execute the instructions stored in the memory to determine, as the update parameter value, a candidate parameter value of the candidate parameter values, the candidate parameter value corresponding to a highest level of network performance.

16. The apparatus of claim 14, wherein the processor is further configured to execute the instructions stored in the memory to update the quantization parameter with respect to each of more than two of the plurality of layers.

17. A method of updating a fixed point neural network of a neural network system, the fixed point neural network corresponding to a quantized floating point neural network, the method comprising:
selecting at least one layer from among a plurality of layers of a first fixed point neural network as an object layer;
generating candidate parameter values based on a parameter value which is set with respect to a quantization parameter of the object layer;
determining levels of network performance, each of the levels of network performance respectively corresponding to a respective one of the candidate parameter values;
comparing the levels of network performance with each other to determine a candidate parameter value corresponding to a highest level of network performance; and
updating the quantization parameter based on the candidate parameter value of the candidate parameter values, the candidate parameter value corresponding to the highest level of network performance.

18. The method of claim 17, wherein the first fixed point neural network includes N sequentially processed layers,
wherein an Nth layer from among the N sequentially processed layers is selected as the object layer, and
wherein N is an integer equal to or greater than 2.

19. The method of claim 17, wherein the determining the levels of network performance includes calculating a plurality of levels of network performance with respect to one of the candidate parameter values, based on a plurality of evaluation references, and performing a weighted-sum operation based on the plurality of levels of network performance and weights which are set with respect to the plurality of levels of network performance, respectively.

20. The method of claim 17, further comprising:
determining whether or not the highest level of network performance is equal to or higher than a reference value after the updating of the quantization parameter; and
newly setting layers of the plurality of layers, except for the object layer, as the object layer, generating the candidate parameter values with respect to the object layer as newly set, deriving the levels of network performance, and updating the quantization parameter in response to determining the highest level of network performance is not equal to or higher than the reference value.

* * * * *